United States Patent [19]

Beck et al.

[11] 4,327,948

[45] May 4, 1982

[54] ANTISKID BRAKE CONTROL FOR AIRCRAFT

[75] Inventors: Arnold A. Beck, Clinton; Edgar J. Ruof, Akron, both of Ohio

[73] Assignee: Goodyear Aerospace Corporation, Akron, Ohio

[21] Appl. No.: 933,348

[22] Filed: Aug. 14, 1978

[51] Int. Cl.³ .............................................. B60T 8/02
[52] U.S. Cl. ..................................... 303/96; 244/111; 303/106; 303/110
[58] Field of Search ................. 303/96, 104, 105, 106, 303/108, 92, 110, 115; 361/238, 239, 240; 340/62; 324/162; 244/111

[56] References Cited

U.S. PATENT DOCUMENTS

| | | | |
|---|---|---|---|
| 3,724,902 | 4/1973 | Ruof | 244/111 |
| 3,880,475 | 4/1975 | Booher | 303/106 |
| 3,966,266 | 6/1976 | Atkins | 303/110 |

*Primary Examiner*—Reinhard J. Eisenzopf
*Attorney, Agent, or Firm*—P. E. Milliken; E. W. Oldham; R. L. Weber

[57] ABSTRACT

An antiskid brake control wherein sensitive deceleration detectors present output signals to a valve driver for releasing brake pressure. The deceleration detector output is also passed to a modulator which acts as a memory circuit to keep the average brake pressure near the skid level and also provides for a controlled reapplication of brake pressure following the release. A constant current discharge circuit is connected to the modulator to provide a linear discharge of the modulator capacitor. A fast recovery circuit is interconnected between the deceleration detector and modulator to rapidly discharge the modulator capacitor in the event that no outputs from the deceleration detector have been sensed for a predetermined period of time. The control system includes gain control circuitry to provide for at least three distinct system gains. Also provided as a portion of the invention is touchdown protection circuitry which holds brake pressure off when the aircraft is in the air and for a fixed time period following touchdown, unless the wheels have spun-up past a predetermined rotational speed. Such circuitry further controls reapplication of the antiskid system to the braking effort following a bounce of the braked wheels.

35 Claims, 6 Drawing Figures

ANTISKID BRAKE CONTROL FOR AIRCRAFT

BACKGROUND OF THE INVENTION

The invention disclosed herein resides in the art of antiskid control circuitry for operation in the braking systems of wheeled vehicles. Particularly, the invention comprises a circuit for implementation between wheel speed transducers associated with the wheels of an aircraft and a valve or valves for braking the wheels in such a manner as to optimize braking efficiency. While the invention discussed hereinafter is with respect to an aircraft having two braked wheels, both wheels being controlled by the same valve, it will be understood that such need not be the case and that the techniques and circuitry described are equally applicable to aircraft or other vehicles having any number of braked wheels and which may be controlled independently of each other.

Heretofore in the art, a vast number of antiskid systems have been developed and utilized. Such systems have generally incorporated a squat switch and associated circuitry to assure that brake pressure is dumped upon touchdown. However, no known systems provide for brake pressure being enabled a predetermined time period after touchdown or upon the wheels reaching a predetermined rotational speed, whichever occurs first.

In antiskid systems, the prior art teaches the utilization of modulators which are unaffected by small perturbations of the wheel deceleration signals above a predetermined deceleration threshold level, but not exceeding an inherent modulator threshold level. Hence, not all changes in wheel deceleration above the deceleration threshold affect the modulator output. Further, such deceleration signals have been generated by deceleration detectors which fail to provide fast response to changes in wheel deceleration and which are generally complex with respect to threshold and gain calibration.

Other inherent problems in the prior art include but a single system gain which cannot be automatically adjusted to compensate for the severity of skids experienced, or for a decrease in runway coefficient over a prolonged period of time. Further, in certain known systems, the discharge rate of the modulator capacitor is exponential, resulting in a nonlinear operation of the modulator, and there is no provision for means to adjust the modulator discharge rate when no skids are experienced for a particular period of time.

Any attempts to overcome the problems inherent in the prior art as set forth above have generally been both complex in nature and expensive in cost and, hence, have not been suitable for implementation in the industry.

OBJECTS OF THE INVENTION

In light of the foregoing, it is an object of the instant invention to present an antiskid brake control for aircraft which includes means to hold brake pressure off at touchdown and for a fixed time period thereafter, or until all of the braked wheels have spun-up to a predetermined rotational speed.

Another object of the invention is to present an antiskid control for aircraft which includes a modulator responsive to all changes in wheel deceleration, above a single deceleration threshold, regardless of amplitude, to adjust the modulator level and brake pressure accordingly.

A further object of the invention is to provide an antiskid brake control for aircraft which includes a deceleration detector providing a fast response to changes in wheel deceleration, and including simplified threshold calibration, no requirement for gain calibration, and improved temperature stability in light of the prior art.

Still another object of the invention is to provide an antiskid brake control for aircraft wherein the deceleration detector includes a lead network connected to the valve driver to provide fast system response to deceleration perturbations.

Yet another object of the invention is to present an antiskid brake control for aircraft which includes circuitry to provide different system gains, automatically adjusted and controlled by depth of skid or magnitude of the runway coefficient.

Still another object of the invention is to provide an antiskid brake control for aircraft including circuit means for achieving a constant rate of current discharge of the modulator capacitor.

Still a further object of the invention is to provide an antiskid brake control for aircraft which includes circuit means for adjusting the modulator output when no incipient skids are experienced by the aircraft for a fixed period of time.

An additional object of the invention is to provide an antiskid brake control for aircraft which is reliable in operation, highly sensitive to aircraft wheel speed changes, and capable of achieving all of the foregoing objects in a cost effective manner.

SUMMARY OF THE INVENTION

The foregoing and other objects of the invention which will become apparent as the detailed description proceeds are achieved by an antiskid control circuit for aircraft having an antiskid valve for controlling the braking of the wheels thereof, and a transducer for each wheel producing a wheel speed signal indicative of the instantaneous rotational speed of the associated wheel, comprising: deceleration detection means connected to and receiving the wheel speed signals from the transducers for presenting an output signal when the rate of deceleration of a wheel exceeds a predetermined threshold; a valve driver interconnected between said deceleration means and the antiskid valve, responsive to said output signal to release brake pressure; a modulator interconnected between said deceleration detection means and said valve driver, responsive to said output signal to increase brake pressure at a predetermined rate following said release; and wherein said valve driver includes gain control circuitry responsive to said deceleration detection means and said modulator to regulate the effect of the modulator and deceleration detection means on the antiskid valve as a function of the amplitude and frequency of occurrence of said output signal.

DESCRIPTION OF THE DRAWINGS

For a complete understanding of the objects, techniques, and structure of the invention, reference should be had to the following detailed description and accompanying drawings wherein.

DETAILED DESCRIPTION OF THE PREFERRED EMBODIMENT

Figure 1:
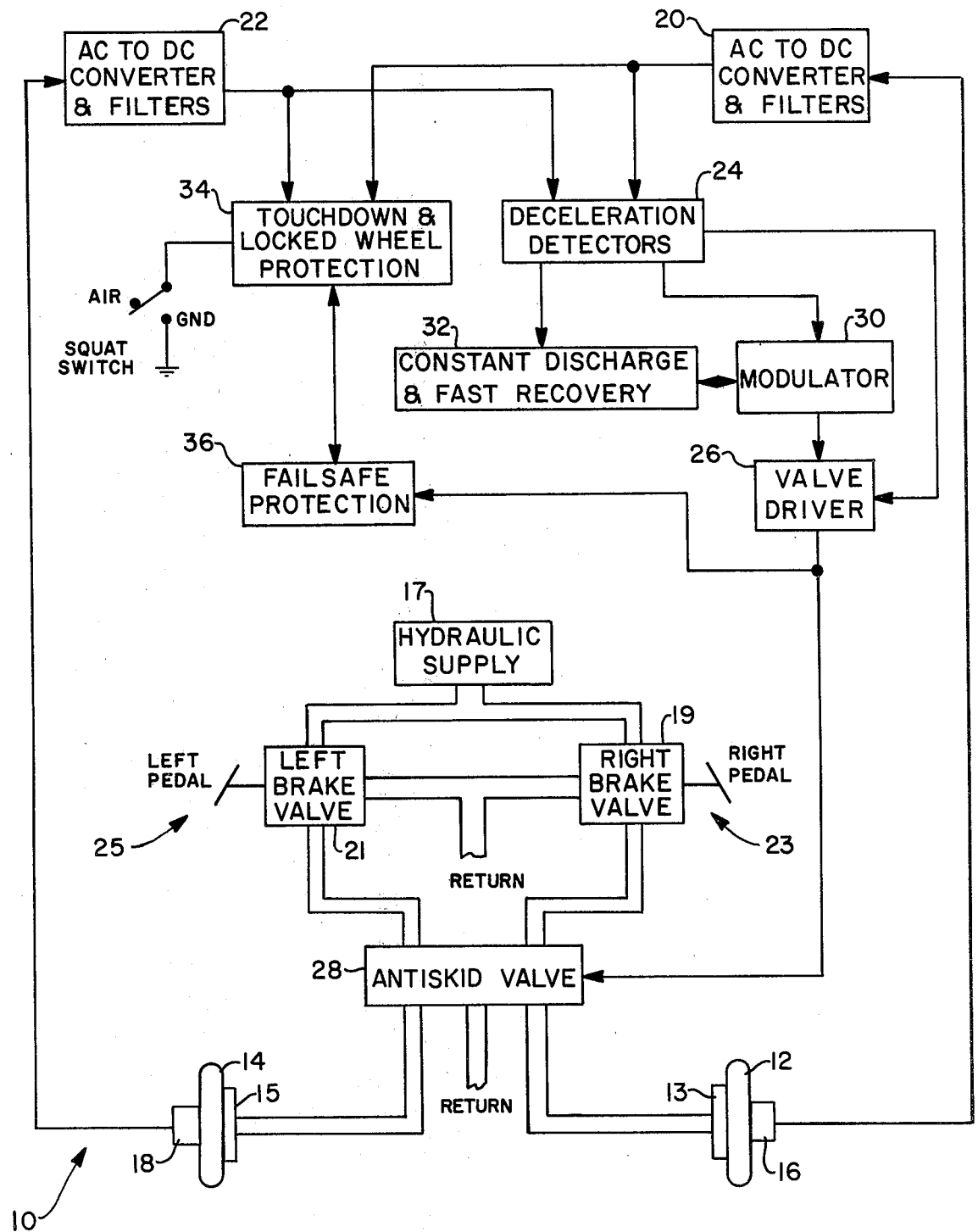
FIG. 1 is a functional block diagram of the antiskid system of the invention.

Referring now to the drawings and more particularly FIG. 1, it can be seen that an antiskid brake control system for aircraft is designated generally by the numeral 10. The circuit shown is for use on an aircraft having a pair of braked wheels, a right wheel 12 and a left wheel 14. However, the invention herein is not limited to such an aircraft and it will be understood by one skilled in the art to extend to applications on aircraft having more than two braked wheels. In any event, the disclosed embodiment includes hydraulic brakes 13,15 respectively associated with the wheels 12,14. Pressure is supplied to the brakes 13,15 from the hydraulic supply 17 as regulated by the right and left brake valves 19,21, the same being under pilot control via the pedals 23,25. An antiskid valve 28 is interposed between the brake valves 19,21 and the brakes 13,15. Under control of the circuitry to be described hereinafter, the valve 28 regulates the pressure from the brake valves 19,21 to the brakes 13,15 to optimize the braking effort. The antiskid valve 28 may be a dual second stage valve, one stage connected to each of the brakes 13,15 to achieve a paired wheel brake control. Such a valve and hydraulic arrangement has heretofore been known to those skilled in the art.

Associated with the wheels 12,14 are respective wheel speed transducers 16,18 which, in standard fashion, produce an AC output signal proportional to the rotational speed of the associated wheel. Each of the transducers 16,18 pass their respective AC signals to an associated converter 20,22 to create a DC level of amplitude proportional to the instantaneous wheel speed. Each of the converters 20,22 may have filters associated therewith for substantially eliminating any noise components in the wheel speed signals. As is now known in the art, a notch filter may be included to attenuate signals from the fore/aft movement of the strut at the strut natural frequency. Such a filter may be a third order active filter having a band reject region determined particularly for the strut characteristics of the aircraft. In any event, there are DC signals emitted from the converters 20,22 of amplitude proportional to the rotational speed of the associated wheel.

The deceleration detectors 24 receive the DC outputs of the circuits 20,22. While the circuit 24 will be discussed in detail hereinafter with respect to FIG. 2, suffice it to say that the deceleration detectors determine the time rate of change of the output signals of the circuits 20,22 to determine the deceleration rate of the wheels 12,14. Fundamentally, when either of such deceleration rates exceeds a threshold level, the deceleration detector emits an output to the valve driver 26 for an immediate adjustment of braking action via the single antiskid valve 28 controlling both wheels 12,14.

The deceleration detectors 24 also emit an output indicative of wheel deceleration to the modulator 30 which, in somewhat standard fashion, helps control the reapplication of brake pressure via the valve driver 26 after brake pressure has been released following an output of the deceleration detector 24. The modulator 30 will be shown in greater detail in FIG. 3 to include circuit means allowing it to respond to the smallest of wheel deceleration signals from the circuit 24 to thus achieve sensitive control of the braking action.

Figure 5:
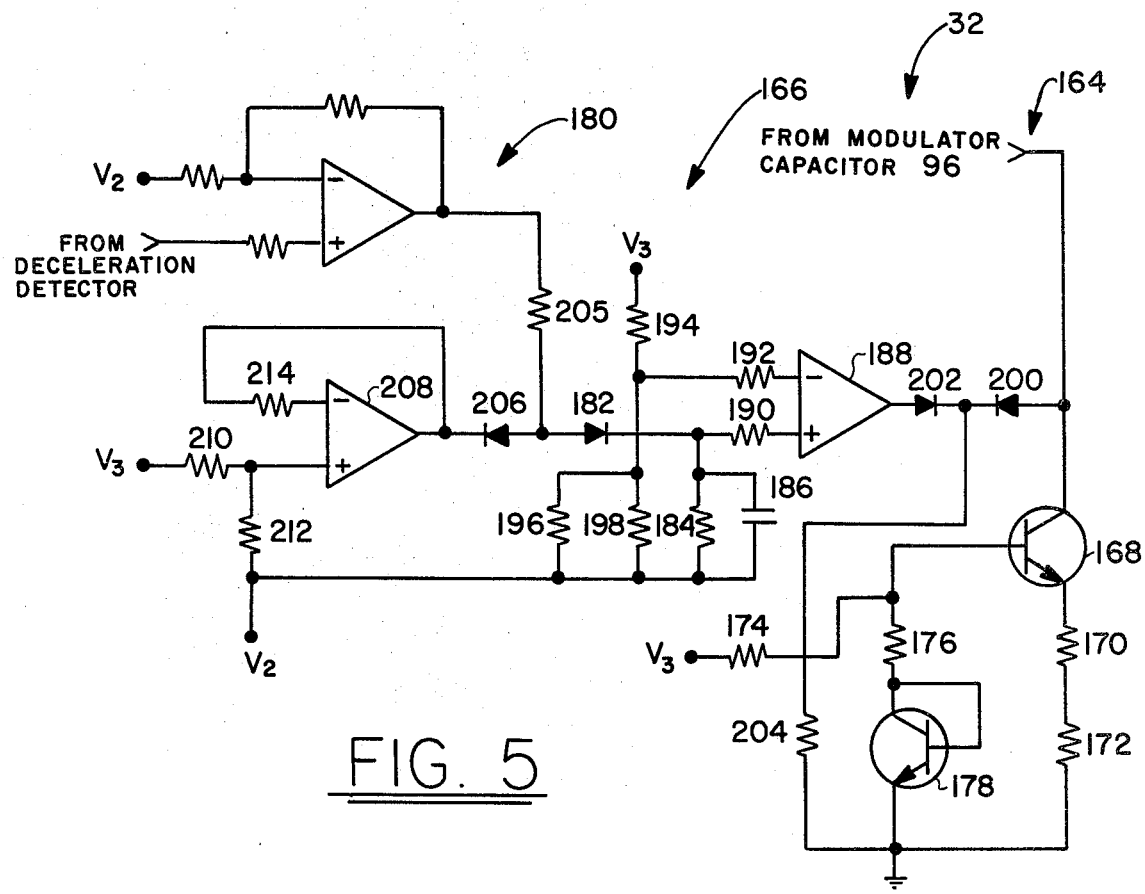
FIG. 5 is a circuit schematic of the slow discharge and fast recovery circuit of the invention.

Interconnected between the deceleration detectors 24 and modulator 30 is a constant discharge and fast recovery circuit 32. This circuit, again described in detail with respect to FIG. 5, provides a fixed linear discharge bias on the modulating capacitor of the modulator 30, and further provides means for adjusting the output of the modulator 30 when the outputs of the circuit 24 indicate that no incipient skids have been experienced for a particular time duration.

Figure 6:
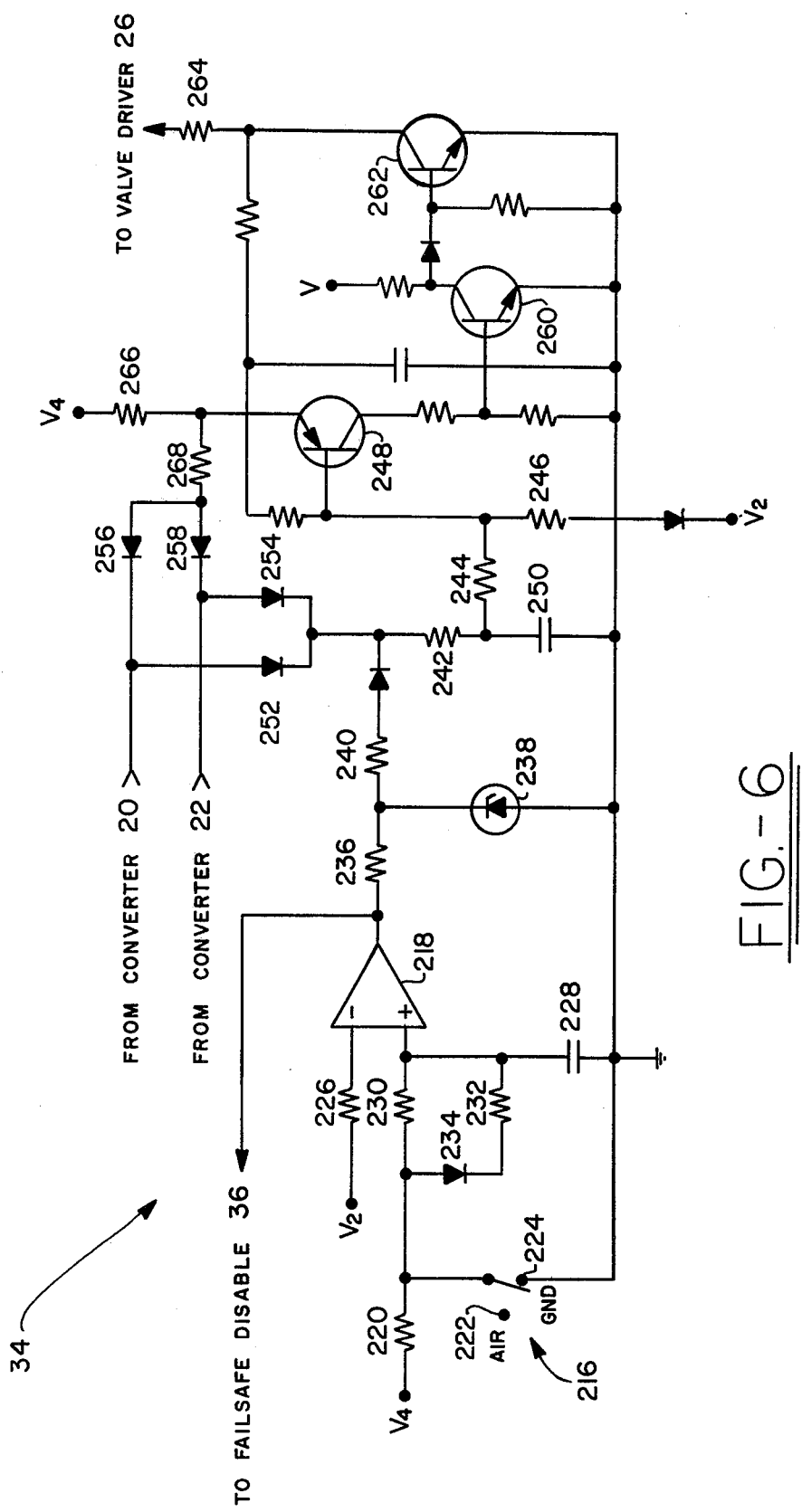
FIG. 6 is a schematic diagram of the touchdown and locked wheel detection circuitry of the invention.

A touchdown and locked wheel protection circuit 34, shown in detail in FIG. 6, is operative to guarantee a full dump of brake pressure via the valve driver 26 before touchdown and to again dump pressure should the aircraft experience a bounce. The circuit 34 further guarantees that a full dump of brake pressure will exist until both wheels 12,14 have either spun-up to a predetermined rotational speed, or after a certain time has elapsed after touchdown. The circuit 34 is further connected to a failsafe detection circuit 36, which, as is standard in the art, is operative to render the antiskid system 10 inoperative should certain failures occur. The touchdown and locked wheel protection circuit 34 overrides and negates certain outputs of the failsafe detection circuit 36 before touchdown and for a fixed period of time after touchdown.

With final reference to FIG. 1, it should be noted that the valve driver circuit 26 further includes the system gain control circuitry necessary for achieving, in this embodiment, three distinct levels of system gain. A low level of gain for deep skids; and another level of gain when the system is operating for a period of time where a low coefficient of friction or mu is existent between the runway and the wheels 12,14.

DECELERATION DETECTORS

Figure 2:
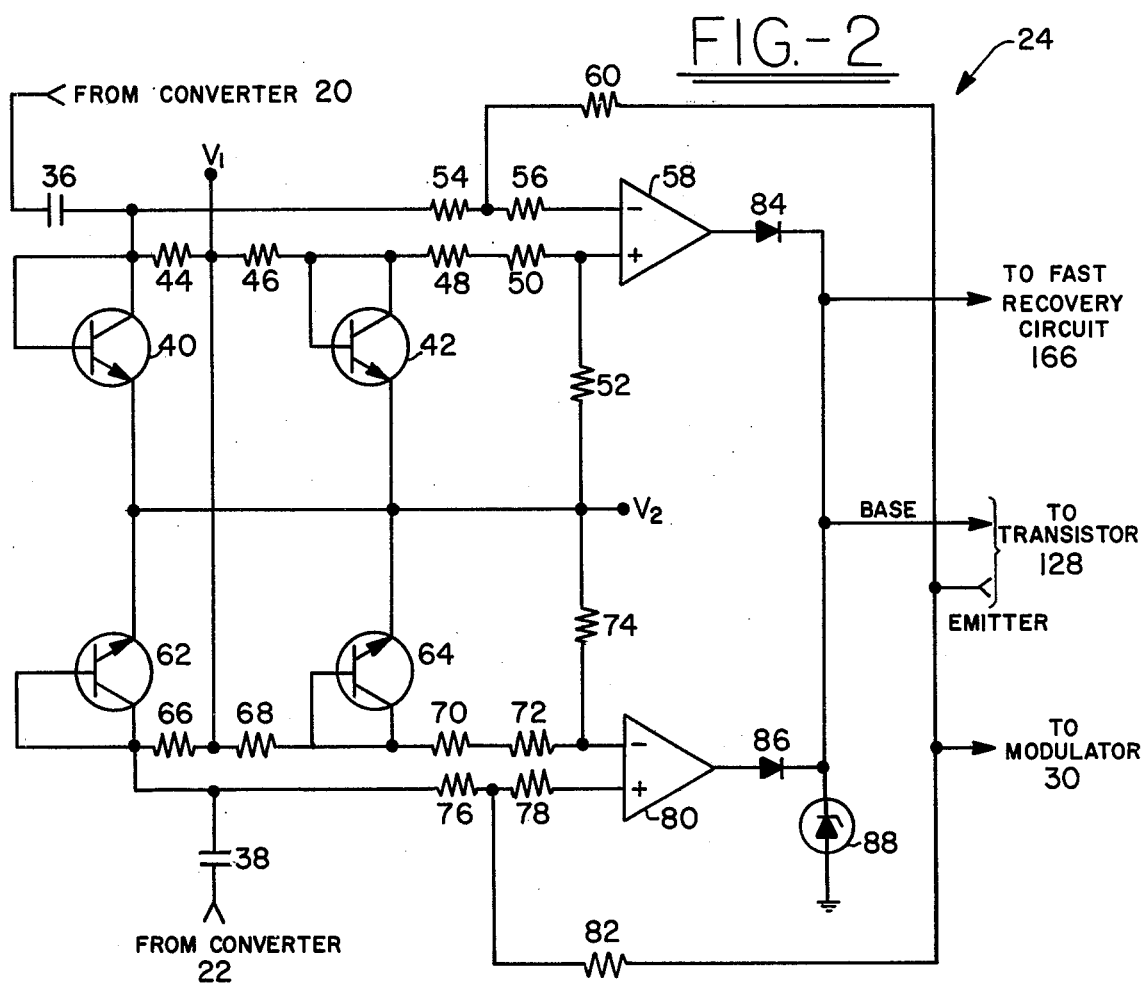
FIG. 2 is a detailed schematic of the deceleration detectors of the invention.

With reference now to FIG. 2, the detailed circuitry of the deceleration detectors of the invention may be seen. Filtered wheel speed signals are applied to the deceleration capacitors 36,38, one for each of the two braked wheels of the aircraft. These signals are in the form of varying DC voltages of amplitude proportional to instantaneous wheel speed. As the wheel speed changes, the voltage across the deceleration capacitors 36,38 correspondingly changes and results in a current thereacross proportional to the deceleration of the associated wheel. Discussion hereinafter will be with respect to the circuitry of the deceleration detector associated with one of the braked wheels of the aircraft, it being appreciated that identical circuitry is associated with the other wheel. As is shown in FIG. 2, the circuitry comprising elements 40-60 is substantially identical to the circuitry comprising elements 62-82, and operates in an identical manner.

The capacitor 36 is connected to transistor 40, functioning as a diode. The emitter of the transistor 40 is connected to a voltage source V2 with the base and collector being biased by a voltage V1 applied through the resistor 44. The voltages V1 and V2 are DC levels supplied from master-slave voltage supplies such that voltage drift is minimized and any drift in one also occurs in the other. Hence, with V1 being a higher positive voltage than V2, the separation between V1 and V2 remains constant. Consequently, with no wheel speed signal being applied to the deceleration capacitor 36, a fixed current is supplied from V1 through the resistor 44 and the transistor 40 to the voltage level V2.

A second transistor 42, functioning as a diode, is interconnected between the voltage supplies V1 and V2 by means of the resistor 46. It is preferred that the transistors 40, 42 be of identical nature, from the same integrated circuit chip, such that they exhibit identical electrical characteristics. As will become apparent hereinafter, this is important to ensure temperature stability and high sensitivity of the deceleration detector 10 to the slightest variations in wheel speed. In any event, the transistor 42 sets the voltage at the interconnection of the base and collector at one diode drop above the level V2. The resistors 48-52 then function as a voltage divider network to set a threshold level on the positive input of the operational amplifier 58. Preferably, the resistors 48-52 are precision resistors. The negative input of the amplifier 58 is connected via resistors 54,56 to the deceleration capacitor 36.

In operation, when the wheel associated with the circuitry just described is accelerating, the resultant increasing current is shorted to the reference level V2 by means of the transistor 40 and, hence, the amplifier 58 is unaffected thereby. However, when the associated wheel begins to decelerate, current is drawn from the base-collector of the transistor 40 to the capacitor 36. There is a resultant voltage drop at the negative input of the operational amplifier 58 which, with the proper bias set on the positive input via the divider 48–52, presents an output evidencing the fact that the deceleration rate has exceeded the threshold level.

Figure 4:
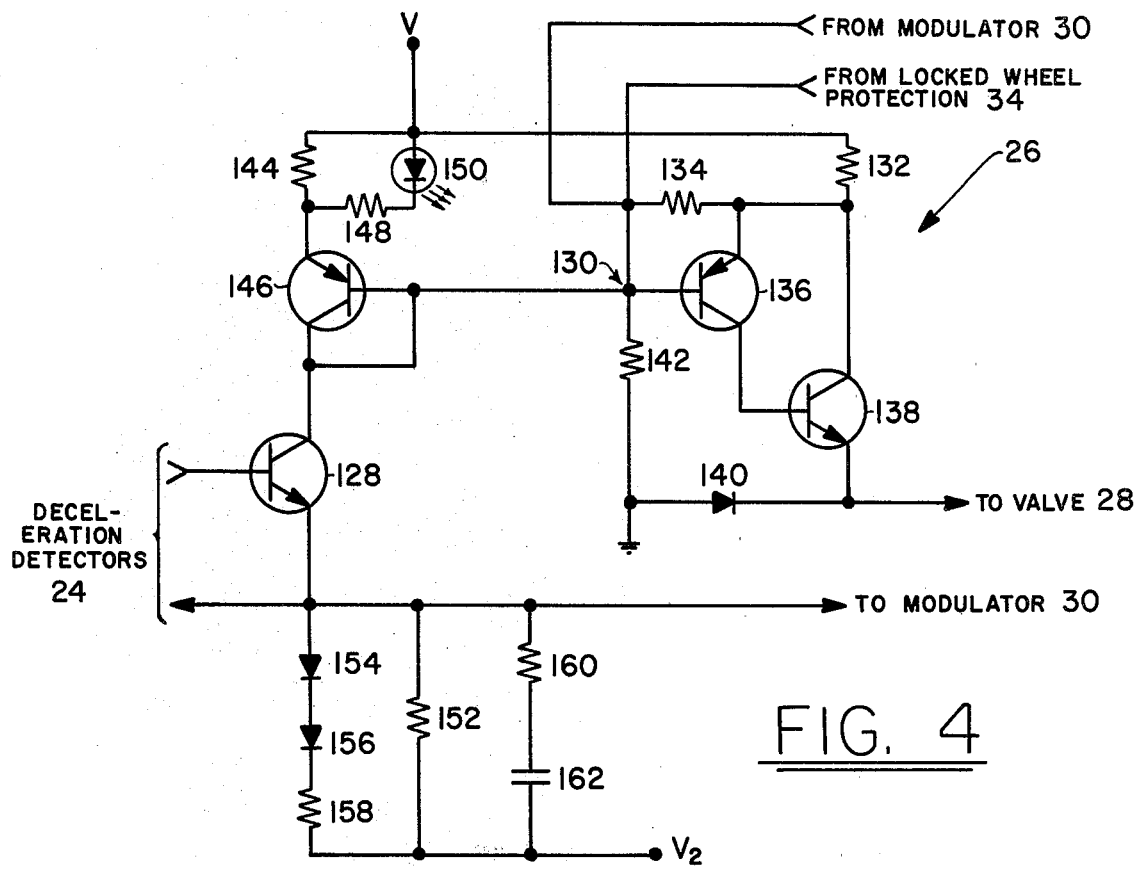
FIG. 4 is a circuit schematic of the valve drivers and system gain control circuitry of the invention.

The outputs of the operational amplifiers 58,80 are applied via isolation diodes 84,86 to the input transistor 128 of the valve driver. The diodes 84,86 act as an "OR" circuit such that a signal from either deceleration detector is passed to the same valve driver. For individual wheel control (not shown), there would be a separate valve driver and modulator for each deceleration detector. As can be seen in FIG. 4, the base of the input transistor 128 receives this output signal with the emitter returning to respective feedback resistors 60,82. Effectively, then, the feedback circuits of the amplifiers 58,80 are from a common point through a diode so that both amplifiers have the same gain associated therewith and, since the base-emitter of the transistor is not a resistive element, the same bears no role in determining that gain. A zener diode 88 is provided as shown to limit the positive voltage output excursions of the amplifiers 58,80.

It should be appreciated that with the voltage sources V1 and V2 being provided from a common voltage source, with the voltages V1 and V2 tracing each other, and with the transistors 40,42 being of substantially identical electrical characteristics, the circuitry 10 provides deceleration detectors which have better control of the threshold time constant, better temperature stability, and a more simplified threshold calibration than heretofore known in the art. Further, no gain calibration of the amplifiers is required.

MODULATOR

Figure 3:
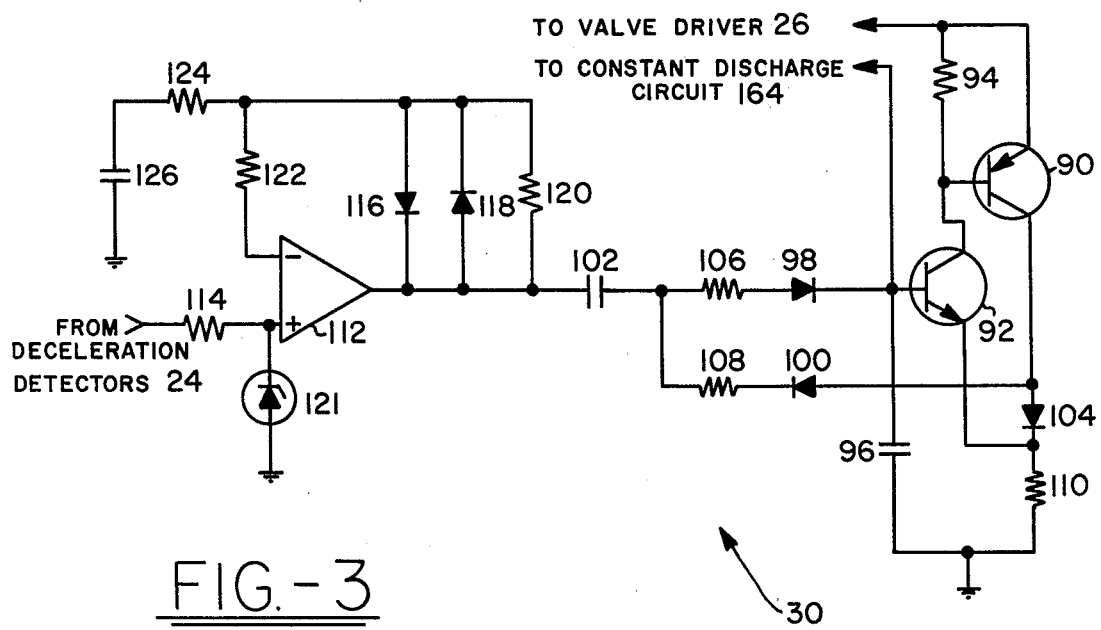
FIG. 3 is a circuit schematic of the modulator of the system of the invention.

The modulator 30 is shown in detail in FIG. 3. It can be seen that the same includes a PNP transistor 90 connected to and controlled by an NPN transistor 92. A resistor 94 is interconnected between the collector of the transistor 90 such that conduction of the transistor 92 will effectuate a voltage drop across the resistor 94 to gate the transistor 90 into conduction. The transistor 92 is controlled by the charge on the modulator capacitor 96, this charge being supplied by a diode pump.

With an input signal applied to the capacitor 102, the capacitor 96 is charged via resistor 106 and diode 98. The relationship between the amount of charge placed upon the capacitor 96 and amplitude of the signal incident to the capacitor 102 is dependent upon the ratio between the sizes of the capacitors. In any event, this charge gates the transistor 92 into conduction and, in turn, the transistor 90 is turned on to conduct current from the valve driver to ground through the diode 104 and resistor 110. A portion of the current passing through the transistor 90 replenishes the charge on the capacitor 102 via the diode 100 and resistor 108, and causes the voltage level on the right side of the capacitor 102 to be near the voltage level on the capacitor 96. It will be apparent to those skilled in the art that the diode 104 compensates for the voltage drops experienced across the base-emitter junction of the transistor 92 and diode 100, and further provides for temperature compensation of these devices.

In operation, it has been found that the diode 98 blocks small excursions of the input signal to the capacitor 102 from effecting conduction of the transistor 92. Hence, with the input signals to the capacitor 102 being those from the deceleration detectors 24 indicating skidding conditions, very small or incipient skids do not result in a modification of the braking action through the modulator. Consequently, a compensation network has been devised such that the smallest of signals from the deceleration detector will effectuate a modification in the braking effort via the modulator. Such a circuit includes the operational amplifier 112 receiving an input from the deceleration detectors 24 through input resistor 114. As discussed with respect to the deceleration detectors 24, the signal input is passed through the base-emitter portion of the transistor of the valve driver circuit of FIG. 4. A feedback circuit is provided to the negative input of the amplifier 112 and comprises diodes 116,118 and a resistor 120, each in parallel connection with the other, and connected to the resistor 122 to complete the feedback network. As is known to those skilled in the art, when a signal is applied from the deceleration detector to the positive input of the operational amplifier 112, the negative input to that amplifier will obtain the same level. If the signal applied to the positive input is a positive one, the output of the amplifier 112 will be one diode drop above the negative input by virtue of the diode 118. Similarly, if the signal to the positive input of the amplifier 112 is a negative one, the output of the amplifier 112 will be one diode drop below that signal level by virtue of the diode 116. Consequently, the signal which is eventually applied to the capacitor 102 of the diode pump is equivalent to the deceleration detector signal applied to amplifier 112 and compensated by one diode drop. Hence, the diode drop of the diode 98 has been preconsidered and even the smallest of signals from the deceleration detector will affect the modulator. Zener diode 121 is connected at the positive input of amplifier 112 to limit the magnitude of the deceleration signal to the modulator 30 to keep the modulator from overcharging during patchy runway conditions.

The resistor 124, connected to the feedback network of the operational amplifier 112 is capacitively connected to ground via the capacitor 126. The elements 124,126 provide the requisite current path necessary to achieve the diode drop of the diode 118 and further provides, via the amplifier 112, greater amplification for the AC component of the output of the deceleration detector. Further, the resistor 120, in parallel connection with the diodes 116,118 is provided to reduce the current flow through the diodes. This is done since the current passing through the diode 118 is different from that passing through the diode 98 and, hence, with the resistor 120 drawing some of the feedback current, the transmission characteristics of diode 118 are drawn more closely akin to those of the diode 98. Diode 116 allows capacitor 126 to discharge and thus be ready to accept charge on the next skid cycle.

In operation, it has been found that the utilization of the modulator circuitry 30 results in an alleviation of the "doublet" characteristic in many braking systems. This is because each release of brake pressure, regardless of how small the causal deceleration detection signal, affects the modulator.

It will be appreciated by those skilled in the art that the modulator 30, while being more sensitive than those heretofore known, functions to achieve a standard object. The modulator capacitor 96 is charged by outputs from the deceleration detectors 24 indicating that at least one of the paired wheels is decelerating at a rate exceeding the predetermined threshold. While the outputs from the deceleration detectors 24 release brake pressure by application to the valve driver 26, the resultant charge on the capacitor 96 provides for a voltage signal to keep brake pressure near the skid level upon termination of the output from the deceleration detectors 24. Brake pressure then gradually increases as the capacitor 96 discharges through the constant discharge circuit 164 of FIG. 5. As the brake pressure increases, a point is again reached where the deceleration of one or both of the wheels exceeds the threshold level, the deceleration detectors 24 produce an output, and the cycle just described repeats itself. Of course, the period of reapplication of brake pressure is controlled by the charge on capacitor 96 which, in turn, is directly dependent upon the severity of the skid or the excess of the deceleration rate of the wheel above the threshold level. A better understanding of this operation will be had with the discussions following respecting FIGS. 4 and 5.

VALVE DRIVERS AND SYSTEM GAIN CONTROL CIRCUITRY

FIG. 4 shows in detail the valve current driver and system gain control circuitry of the invention as the same is designated by the numeral 26. As can be seen, a transistor 128 is connected to and controlled by the output of the deceleration detectors 24 discussed earlier herein. As mentioned above, the feedback network and, hence, the gain control of the deceleration detector amplifiers 58,80 is through the diode of the transistor 128.

The collector of the transistor 128 is connected to the summing point 130 which provides an input to the current driver comprising resistors 132,134 and transistors 136,138. Such current driver, under control of the input signals to summing point 130, operates in the standard fashion known in the art and is therefore not elaborated upon herein. It will be noted that a freewheeling diode 140 is connected between ground and the valve coil, which is driven by the emitter of the transistor 138. This diode is provided for purposes of effectively shunting the antiskid valve coil to dissipate any currents induced therein by virtue of the inductive characteristics thereof.

The collector of the transistor 128 is connected to the main DC power source V of the aircraft through the resistor 144 and the transistor 146 which is connected as a diode. Connected in shunt with the resistor 144, for purposes to be discussed hereinafter, is a resistor 148 and an LED 150, the LED 150 having a characteristic diode drop of approximately double that of a standard diode, and providing a temperature-stable voltage threshold level.

It can be seen that the deceleration detectors 24 provide an input to the current summing point 130 via the transistor 128. There is also provided an input to the summing point 130 from the transistors 90,92 of the modulator capacitor 96. A third signal is provided to the summing point 130 via the biasing resistor 142 connected to ground. Yet a fourth signal is provided to the summing point 130 from the locked wheel circuit via resistor 264.

When a small or incipient skid is experienced, the deceleration detector circuit applies a correspondingly small voltage to the base of the transistor 128. If this voltage provides an emitter voltage on the transistor 128 less than two diode drops above the voltage V2, the resistor 152 determines the collector current of the transistor 128 and, consequently, the deceleration detector signal input to the summing point 130. The current driver 132-138 correspondingly drives the antiskid valve 28 to release brake pressure. If a deeper skid is experienced, and the emitter voltage of the transistor 128 is two diode drops or more greater than the voltage V2, the diodes 154,156 conduct and place the resistor 158 in parallel with the resistor 152. This reduced emitter resistance draws a greater current through the transistor 128, resulting in a larger signal input to the summing point 130 with correspondingly more current from the driver 132-138 to release the antiskid valve even more. There are thus provided in the emitter circuit of the transistor 128 two system gain levels, a lower gain provided by the resistor 152, and a higher gain provided by the shunting of the resistor 152 by the resistor 158. In the normal mode of operation, with only incipient skids being experienced, the system gain will be determined by the resistor 152. However, a wet spot encountered on the runway, dropping the mu between the braked wheel and the runway, may result in a skid of sufficient magnitude to shunt the resistor 152 with the resistor 148 and thus greatly increase the system gain.

It will be noted that there is also included in the emitter circuit of the transistor 128 a lead network comprising the resistor 160 and capacitor 162. When a sharp change in runway coefficient or mu is experienced, the resultant change in signal from the transistor 128 will provide a current across the capacitor 162 with a corresponding signal being provided at the summing point 130 to effect an instantaneous change in valve current via the driver 132-138 to release brake pressure immediately.

As mentioned above, yet another input to the summing point 130 is a signal from the transistors 90,92 of the modulator 30, which is in turn controlled by the modulator capacitor 96. When the runway coefficient is reduced for a period of time, as with a wet runway for example, the modulator capacitor 96 builds up a charge from repeated outputs of the deceleration detectors 24 which turns on transistors 90,92 drawing more and more current from the voltage source V through the resistor 144, diode 146, and summing point 130. When sufficient current is drawn through the resistor 144 to equal the characteristic voltage drop of the LED 150, current is drawn through the LED 150 and resistor 148 in parallel with the resistor 144. There is thus a reduced voltage change at the summing point 130 for continued current increase, with a resultant change in current gain for the driver 132-138.

It will be appreciated that with the resistor 148 shunting the resistor 144, there is a reduction in system gain provided from the modulator and occurring at times when the runway coefficient is low, which causes the modulator voltage to increase. Such a reduction in gain is desirable such that the modulator will continue to effect the system's operation without allowing the brake pressure to swing in such degrees as to operate as an on/off system.

It can thus be seen that the valve driver and system gain control circuitry 26 provides for at least three distinct system gains or modes of operation. For incipient skids, the gain is relatively low. For deeper skids, the gain is increased for a greater release of valve pressure, while for prolonged periods of reduced coefficient, the gain is reduced again. It will be readily recognized by one skilled in the art that these various gains may be superimposed on each other with the low gain of the modulator being summed with the high gain from the deceleration detector to provide an appropriate control signal to the valve driver 132-138.

CONSTANT DISCHARGE AND FAST RECOVERY CIRCUIT

With reference now to FIG. 5, it can be seen that the circuit element 32 includes a constant discharge circuit 164 and fast recovery circuit 166. As shown in FIG. 1, in the system of the invention interconnection is made by the circuits 164,166 with the modulator 30 and deceleration detectors 24. The constant discharge circuit 164 comprises elements 168-178 and provides a constant current discharge of the modulator capacitor 96. In other words, the circuit 164 provides for a controlled reapplication of pressure following a release. To this end, the collector of the transistor 168 is connected to the modulator capacitor 96 with the emitter circuit including resistors 170,172 connected to ground. Of course, a single resistor could be used in the emitter circuit, but it is contemplated that one of the resistors 170, 172 be a calibration resistor. The base of the transistor 168 is connected to a voltage divider interconnected between the voltage source V3 and ground. This voltage divider comprises resistors 174,176 and a transistor 178 connected as a diode. The transistor 178 is provided for temperature compensation of the base-emitter junction of the transistor 168. In any event, there is provided at the base of transistor 168 a voltage of fixed level which is, as it effects the transistor 168, impervious to temperature changes. The circuit 164 takes advantage of the fact that current flow through the collector of a transistor is largely independent of the voltage across it. This current is determined by the resistor 170, 172 and the base voltage is determined by the voltage divider 174-178. There is thus drawn through the collector-emitter leg of the transistor 168 a constant current supplied from the modulator capacitor.

If no incipient skids are encountered for a short, predetermined time period, indicating the runway coefficient has increased, the brake pressure should be allowed to rapidly increase to the skid level. It is therefore desirable to reduce the modulator voltage when a skid has not been encountered for a particular period of time. For this purpose, a fast recovery circuit 166 is provided in operative connection with the modulator capacitor 96. This circuit is controlled by an input from the deceleration detectors 24 to the operational amplifier circuit 180 which provides a signal gain. When a skid is experienced, the operational amplifier 180 emits an output which is passed through the diode 182 to the RC circuit 184,186. Upon each output from the deceleration detector 24, a certain amount of charge is placed upon the capacitor 186 and consequently upon the positive input of the amplifier 188 via the input resistor 190. This signal decays, in the absence of subsequent deceleration signals, from the capacitor 186, through the resistor 184. The negative input to the amplifier 188 is connected via the input resistor 192 to a voltage divider comprising resistors 194-198, one of the resistors 196,198, preferably being a calibration resistor. In any event, there is a fixed bias voltage applied to the negative input of the amplifier 188. This threshold is set such that when a skid or skids of sufficient frequency and/or amplitude are experienced, the charge on the capacitor 186 is sufficient to produce a positive output of the amplifier 188 which operates as a comparator. With the positive output produced, the diode 200 is back-biased and the output signal of the amplifier 188 passes through the isolation diode 202 and through the resistor 204. If, however, no skids or deceleration signals have been experienced in a period of time sufficient to allow capacitor 186 to discharge through the resistor 184 to a point where the positive input to the amplifier 188 is less than the negative input, the diode 200 becomes forward-biased and a fast discharge path of the modulator capacitor 96 is provided through the diode 200 and resistor 204. The modulator voltage thus decreases quickly to place the braking effort at a point where skids will again be experienced.

A limitation is required on the amplitude of the output of the amplifier circuit 180 and consequently the magnitude of charge to be placed upon the capacitor 186. This is achieved via the resistor 205 and diode 206 connected to the output of the operational amplifier 208. As can be seen, the positive input of the amplifier 208 is fixed at a voltage determined by the voltage divider 210,212 interconnected between the voltage sources V3,V2. There is thus a fixed output of the amplifier 208 fed back to the negative input thereof through the resistor 214, establishing a voltage above which the output of the amplifier circuit 180 may not pass. This is the same amplitude above which the capacitor 186 may not charge. Consequently, in the absence of outputs from the deceleration detector 24, the maximum time for application of the fast recovery circuit to the modulator capacitor 96 is fixed via the discharge rate of the RC network 184,186 and the voltage divider 194,196.

TOUCHDOWN AND LOCKED WHEEL PROTECTION

In antiskid systems it is most desirable that the wheels of the aircraft be free-rolling upon touchdown and that the wheels be allowed to either rotate freely for a fixed period of time or reach a predetermined rotational speed before application of brake pressure or operation of the antiskid system is possible. It is further most desirable that should the aircraft leave the runway after touchdown, as in a bouncing situation, a dump of brake pressure is achieved such that a locked wheel condition will not exist when the wheels again touch down on the runway.

The benefits just described are achieved in the instant invention by the circuitry designated by the number 34 in FIG. 6. As can be seen, this touchdown and locked wheel protection circuitry includes a squat switch 216 connected to the positive input of an operational amplifier 218. The squat switch 216 operates in standard fashion to switch electrical contact depending upon whether the aircraft is in the air or on the runway. As shown, a resistor 220 may connect the voltage supply V4 to the positive input of the operational amplifier 218 via the resistor 230 when the aircraft is in the air. The switch 216 provides a ground potential to the positive input via the contact 224 upon touchdown and during such periods as the aircraft is on the ground.

The negative input of the amplifier 218 is connected to the voltage V2 through the input resistor 226. It will thus be appreciated that the amplifier 218 operates as a comparator with the output thereof being high when the positive input exceeds the negative input and vice-versa. Consequently, with the negative input fixed at the voltage V2, the output of the amplifier 218 is directly dependent upon the voltage incident to the positive input. The capacitor 228 is connected to the positive input and chargeable, when the squat switch 216 is in the air position, through the resistor 230 in parallel with the resistor 232 and diode 234. Discharge of the capacitor 228, with the squat switch 216 being in the ground position, is solely through the resistor 230. Consequently, the charging rate of the capacitor 228 is higher than the discharging rate for purposes which will become apparent hereinafter.

The operational amplifier 218 is connected to an output resistor 236 and clamped by the zener diode 238. Consequently, when the positive input of the amplifier 218 is greater than the negative, the output voltage between the resistors 236,240 is set by the threshold value of the zener diode 238. This value establishes, through the voltage divider comprising resistors 240-246, a velocity override voltage level at the base of the transistor 248. A capacitor 250 is provided to receive and store a charge from the output of the amplifier 218 to hold the same after a change of state of the output thereof. It will also be seen that providing a charging effect to the capacitor 250 are inputs from the left and right wheel speed converter circuits 20,22, the outputs thereof being respectively applied through the diodes 252,254. Signals from the converter circuits 20,22 also effect the emitter voltage on the transistor 248 via the diodes 256,258, the emitter being resistively connected to the voltage V4.

It will be readily apparent to those skilled in the art that the transistor 248 controls the conductivity of the transistor 260 which, in turn, controls the transistor 262. This latter transistor is connected to the summing point of the valve driver circuit through the resistor 264.

In operation, prior to landing, the capacitor 228 is charged to V4, resulting in a high level output from the amplifier 218. This high level output, clamped by the zener diode 238 and reduced by the divider 240-246, gates the transistor 248 off. Resultantly, transistor 260 is turned off with the transistor 262 thus conducting, providing a current drain from the summing point 130 and a full dump of brake pressure. Consequently, upon touchdown, the wheels 12,14 of the aircraft are free-rolling.

Upon touchdown, a squat switch 216 switches to the grounded contact 224 and the capacitor 228 begins to discharge through the resistor 230. When the voltage level on the positive input drops below that of V2 set on the negative input, the output of the amplifier 218 changes to a low state. The capacitor 228 and resistor 230 are selected such that a time interval of approximately two seconds is required for such a decay. Consequently, the output of the amplifier 218 remains high for a two second interval after touchdown, guaranteeing that the wheels will have an opportunity to spin-up.

It should be readily apparent that the transistor 248 controls, to the extent of the activity of the circuitry 34, the application or release of brake pressure. Applied as a controlling input to the transistor 248 are the right and left wheel speed signals from the associated converter circuits. These signals are applied through the diodes 252,254 to the base of the transistor 248 and through the voltage divider comprising resistors 242-246. The wheel speed signals are also applied to the emitter of the PNP transistor 248 via the diodes 256,258. These wheel speed signals change the biasing on the emitter of the transistor 248 via the current passing from the source V4 and flowing through the resistors 266,268. As the wheel speed signals incident to the diodes 256,258 increase, it can be seen that the biasing of the emitter of the transistor 248 similarly increases. Of course, with the wheel speed signals being applied in parallel as shown, the lowest wheel speed signal, corresponding to the slowest revolving wheel, controls such biasing. When the slowest revolving wheel has reached a predetermined speed, established by the voltage divider 242-246, the emitter biasing of the transistor 248 becomes sufficient to bias that transistor into conduction, turning transistor 260 on, and transistor 262 off. Resultantly, the full dump signal is removed from the summing point 130 of the valve driver circuit. It should thus be appreciated that the two second time delay provided by the RC circuit 228-230 may be overcome if both wheels 12,14 have spun-up to a predetermined rotational speed during such two second interval. If both wheels have not reached that speed during the time delay, at least some spin-up has been experienced prior to modulator control of the braking system.

Should the aircraft experience a bounce after being on the runway, a provision is made for rapidly responding to such bounce to guarantee that brake pressure is released when the wheels again touch the runway. Assume, for example, that the aircraft has set down and the transistor 262 has been turned off in a manner described above. Should the aircraft leave the runway such that the squat switch 216 switches to the contact 222, it will be seen that the capacitor 228 will rapidly recharge through the elements 230-234, the recharge rate being much faster than the discharge rate. During the bounce, with the wheels leaving the ground with brake pressure applied, the wheels will effectively lock such that the signal inputs from the left and right wheel speed converter circuits 20,22 effectively disappear. Consequently, the emitter biasing of the transistor 248 is greatly increased, thereby turning the transistor 262 on and providing a pressure dump signal. Upon touchdown anew, the squat switch 216 switches again and the circuit operates in a manner aforesaid, it being appreciated that no brake pressure is applied when the wheels again touch down. It should be briefly noted that while the time delay for wheel spin-up is basically provided by the RC time constant of the circuit 228,230, such time constant only controls the switching of the output of the operational amplifier 218. Once this switch occurs, the capacitor 250 begins to discharge and, as it discharges, it changes the wheel override velocity threshold signal applied to the base of the transistor 248. As this biasing decreases and the emitter biasing increases with increased wheel speed, a point is rapidly reached at which the transistor 262 is caused to conduct and brake pressure may be applied.

In the foregoing description of the preferred embodiment a number of voltages were applied to the circuitry of the system 10. It will be understood that all such voltages may be supplied from the main aircraft DC voltage source V. In the preferred embodiment of the invention, V=28 volts; V1=6.9 volts; V2=4.5 volts; V3=6.2 volts; and V4=18 volts.

Thus it can be seen that the objects of the invention have been satisfied by the structure presented in the accompanying drawings and set forth in detail in the preceding description of the preferred embodiment. While the invention has been set forth with respect to utilization in the braking systems of aircraft, and more particularly for aircraft having paired braked wheels, it is to be understood that the invention is equally applicable to other wheeled vehicles having any number of braked wheels operating either in concert or independently of each other. Consequently, while in accordance with the patent statutes, only the best mode and preferred embodiment of the invention has been presented and described in detail, it is to be understood that the invention is not limited thereto or thereby. For a true appreciation of the scope and breadth of the invention, reference should be had to the following claims.

What is claimed is:

1. An antiskid control circuit for aircraft having an antiskid valve for controlling the braking of the wheels thereof by regulating the application of brake pressure, and a transducer for each wheel producing wheel speed signals indicative of the instantaneous rotational speed of the associated wheel, comprising:
    deceleration detection means connected to and receiving the wheel speed signals from the transducers for presenting an output signal when the rate of deceleration of a wheel exceeds a predetermined threshold;
    a valve driver interconnected between said deceleration detection means and the antiskid valve and responsive to said output signals to release brake pressure;
    a modulator interconnected between said deceleration detection means and said valve driver, responsive to said output signal to further release brake pressure and then increase brake pressure at a predetermined rate following said release; and
    wherein said valve driver includes gain control circuitry responsive to said deceleration detection means and said modulator to modify the effect of the modulator and deceleration detection means on the antiskid valve as a function of the amplitude and frequency of occurrence of said output signal.

2. The antiskid control circuit according to claim 1 wherein said gain control circuitry comprises a modifiable resistance connected to the output of said deceleration detection means.

3. The antiskid control circuit according to claim 2 wherein said modifiable resistance includes first and second resistors connected in parallel, said second resistor being in series connection with at least one current conducting device which becomes conductive upon application of a predetermined voltage thereto.

4. The antiskid control circuit according to claim 3 wherein said current conducting device is a diode.

5. The antiskid control circuit according to claim 3 wherein said gain control circuitry further includes a capacitor in parallel connection with said first and second resistors.

6. The antiskid control circuit according to claim 1 wherein said gain control circuitry comprises a modifiable resistance connected to the output of said modulator.

7. The antiskid control circuit according to claim 6 wherein said modifiable resistance includes first and second resistors connected in parallel, said second resistor being in series connection with at least one current conducting device operative to conduct current only after a predetermined voltage has been applied thereto.

8. The antiskid control circuit according to claim 1 wherein said deceleration detection means comprises:
    a capacitor receiving the wheel speed signals and producing a deceleration signal corresponding to the deceleration rate of the associated wheel;
    an amplifier connected to said capacitor and receiving said deceleration signal; and
    threshold circuit means connected to said amplifier and operatively connected to said capacitor for establishing a predetermined threshold, said amplifier producing an output when said deceleration signal exceeds said threshold.

9. The antiskid control circuit according to claim 8 wherein said threshold circuit means is connected between first and second voltage levels and to a first input of said amplifier, said capacitor being connected to a second input of said amplifier, and which further includes first circuit means interposed between said capacitor and said second input and interconnected between said first and second voltage levels for providing a stable voltage differential between said first and second inputs.

10. The antiskid control circuit according to claim 9 wherein said threshold circuit means includes a voltage divider and second circuit means interconnected between said first and second voltage levels and connected to said voltage divider for providing a predetermined voltage level to said voltage divider, each of said first and second circuit means including a solid state device, said solid state devices being substantially identical such that changes in said voltage differential trace changes in said threshold.

11. The antiskid control circuit according to claim 10 wherein said solid state devices are diodes and wherein said first and second voltage levels are provided by first and second voltage sources interconnected with each other.

12. The antiskid control circuit according to claim 9 wherein the output of said amplifier includes a feedback circuit, said feedback circuit including a transistor being interconnected between the output and one of said inputs of said amplifier.

13. The antiskid control circuit according to claim 12 wherein said transistor is further connected to said gain control circuitry.

14. The antiskid control circuit according to claim 1 wherein said modulator comprises:
    a charging capacitor;
    a solid state device interconnected between said charging capacitor and said deceleration detection means, said solid state device having a characteristic voltage drop associated therewith; and compensation means interconnected between said solid state device and said deceleration detection means for receiving and changing the amplitude of said output signal by said characteristic voltage drop.

15. The antiskid control circuit according to claim 14 wherein said solid state device comprises a first diode and wherein said compensation means comprises an amplifier having a second diode interconnected between an input and the output thereof.

16. The antiskid control circuit according to claim 15 wherein said compensation means further includes a capacitor connected to said input of said amplifier and a third diode in parallel connection with said second diode but oppositely biased with respect thereto.

17. The antiskid control circuit according to claim 1 wherein said modulator includes a charging capacitor operatively connected to and receiving said output signals from said deceleration detection means, and which further includes discharge means connected to said charging capacitor for providing a fixed current discharge of said charging capacitor.

18. The antiskid control circuit according to claim 17 wherein said discharge means comprises a transistor having a fixed predetermined emitter current.

19. The antiskid control circuit according to claim 1 wherein said modulator includes a charging capacitor operatively connected to and receiving said output signals from said deceleration detection means, and which further includes circuit means interconnected between said charging capacitor and said deceleration detection means for discharging said charging capacitor when no output signals are emitted from said deceleration detection means for a particular time period.

20. The antiskid control circuit according to claim 19 wherein said circuit means comprises:
a charging circuit connected to said deceleration detection means, receiving said output signals and aggregately storing charges proportional thereto;
a discharge circuit connected to said charging circuit, providing a discharge path for said charge and tending to constantly reduce said charge; and
comparator circuit means connected to said charging circuit and to said charging capacitor for comparing said charge with a predetermined voltage level and providing a discharge path for said charging capacitor when said charge exceeds said predetermined voltage level.

21. The antiskid control circuit according to claim 20 wherein said circuit means further includes a limit circuit connected to said charging circuit and limiting the charge stored by said charging circuit.

22. The antiskid control circuit according to claim 21 wherein said charging circuit includes a first amplifier interconnected between said deceleration detection means and a capacitor and wherein said discharge circuit comprises a resistor in parallel connection with said capacitor.

23. The antiskid control circuit according to claim 22 wherein said limit circuit includes a second amplifier having a fixed voltage input and an output connected through a diode to the output of said first amplifier and said capacitor.

24. The antiskid control circuit according to claim 23 wherein said circuit means comprises a charging and discharging circuit interconnected between a squat switch and a comparator, said circuit charging to store an electrical charge when said squat switch indicates the aircraft is in the air, and discharging such electrical charge when the aircraft is on the ground, and wherein said comparator produces an output when such electrical charge is below a predetermined level.

25. The antiskid control circuit according to claim 24 wherein said circuit means further includes a gating circuit connected to said valve driver and receiving inputs from the transducers and the output of said comparator, said gating circuit applying a signal to the valve driver releasing brake pressure in the absence of said output of said comparator and when said inputs from the transducers indicate that a wheel is below a predetermined rotational speed.

26. The antiskid control circuit according to claim 1 which further includes circuit means interconnected between said valve driver and the transducers for releasing brake pressure when the aircraft is in the air, and to allow brake pressure to be applied a fixed time period after the aircraft lands or after each wheel has exceeded a predetermined rotational speed.

27. In an antiskid control circuit for aircraft having an antiskid valve for controlling the braking of the wheels thereof by regulating the application of brake pressure, and a transducer for each wheel producing wheel speed signals corresponding to the instantaneous rotational speed of the associated wheel, the improvement of deceleration detection means, comprising:
a capacitor receiving the wheel speed signals and producing a deceleration signal corresponding to the deceleration rate of the associated wheel;
an amplifier connected to said capacitor and receiving said deceleration signal; and
threshold circuit means connected to said amplifier and operatively connected to said capacitor for establishing a predetermined threshold, said amplifier producing an output when said deceleration signal exceeds said threshold, and wherein said threshold circuit is connected between first and second voltage levels and to a first input of said amplifier, said capacitor being connected to a second input of said amplifier, and which further includes first circuit means interposed between said capacitor and said second input and interconnected between said first and second voltage levels for providing a stable voltage differential between said first and second inputs.

28. The improvement in an antiskid control circuit as recited in claim 27 wherein said threshold circuit means includes a voltage divider and second circuit means interconnected between said first and second voltage levels and connected to said voltage divider for providing a predetermined voltage level to said voltage divider, each of said first and second circuit means including substantially identical solid state devices such that changes in said voltage differential trace changes in said threshold.

29. The improvement in an antiskid control circuit as recited in claim 27 which further includes a transistor interconnected between the output and one of said inputs of said amplifier.

30. In an antiskid control circuit for aircraft having an antiskid valve for controlling the braking of the wheels thereof by regulating the application of brake pressure, a transducer for each wheel producing wheel speed signals corresponding to the rotational speed of the associated wheel, and deceleration detection means connected to each transducer and producing an output when the deceleration rate of the associated wheel exceeds a particular level, the improvement of a modulator, comprising:

a charging capacitor;

a first diode interconnected between said charging capacitor and the deceleration detection means, said first diode having a characteristic voltage drop associated therewith; and an amplifier having a second diode interconnected between an input and the output thereof, said amplifier being interconnected between said first diode and said deceleration detection means for receiving and changing the amplitude of said output signal by said characteristic voltage drop.

31. The improvement in an antiskid control circuit as recited in claim 30 which further includes a capacitor connected to said input of said amplifier and a third diode in parallel connection with said second diode but oppositely biased with respect thereto.

32. In an antiskid control circuit for aircraft having an antiskid valve for controlling the braking of the wheels thereof by regulating the application of brake pressure, and deceleration detection means operatively connected to each wheel and producing an output signal when the deceleration rate of the associated wheel exceeds a particular level, the improvement comprising:

a modulator including a modulator capacitor operatively connected to and receiving said output signals from the deceleration detection means; and circuit means interconnected between said modulator capacitor and said deceleration detection means for discharging said modulator capacitor when no output signals are emitted from said deceleration detection means for a particular time period, said circuit means comprising:

a charging circuit connected to said deceleration detection means, receiving said output signals and charges therefrom;

a discharge circuit connected to said charging circuit, providing a discharge path for said charge and tending to constantly reduce said charge; and comparator circuit means connected to said charging circuit and to said modulator capacitor for comparing said charge with a predetermined voltage level, and providing a discharge path for said modulator capacitor when said charge exceeds said predetermined voltage level.

33. The improvement in an antiskid control circuit as recited in claim 32 wherein said circuit means further includes a limit circuit connected to said charging circuit and limiting the charge stored by said charging circuit.

34. The improvement in an antiskid control circuit as recited in claim 33 wherein said charging circuit includes a first amplifier interconnected between said deceleration detection means and a capacitor and wherein said discharge circuit comprises a resistor in parallel connection with said capacitor.

35. The improvement in an antiskid control circuit according to claim 34 wherein said limit circuit includes a second amplifier having a fixed voltage input and an output connected through a diode to the output of said first amplifier and said capacitor.

* * * * *